United States Patent
Roy et al.

(10) Patent No.: US 12,475,555 B2
(45) Date of Patent: Nov. 18, 2025

(54) ARTIFICIAL INTELLIGENCE-BASED HYPERSPECTRALLY RESOLVED DETECTION OF ANOMALOUS CELLS

(71) Applicant: Applied Materials, Inc., Santa Clara, CA (US)

(72) Inventors: Tapashree Roy, Bangalore (IN); Shubhayan Bhattacharya, Bangalore (IN); Kiran Rangaswamy Aatre, Bangalore (IN); Sumit Kumar Jha, Bangalore (IN); Suraj Rengarajan, Bangalore (IN); Riya Dutta, West Bengal (IN)

(73) Assignee: Applied Materials, Inc., Santa Clara, CA (US)

( * ) Notice: Subject to any disclaimer, the term of this patent is extended or adjusted under 35 U.S.C. 154(b) by 385 days.

(21) Appl. No.: 17/993,144

(22) Filed: Nov. 23, 2022

(65) Prior Publication Data
US 2023/0162354 A1    May 25, 2023

Related U.S. Application Data

(60) Provisional application No. 63/282,803, filed on Nov. 24, 2021.

(51) Int. Cl.
*G06T 7/00* (2017.01)
*G06V 10/26* (2022.01)
(Continued)

(52) U.S. Cl.
CPC ............ *G06T 7/0012* (2013.01); *G06V 10/26* (2022.01); *G06V 10/764* (2022.01); *G06V 10/82* (2022.01);
(Continued)

(58) Field of Classification Search
CPC ......... G06T 7/0012; G06T 2207/10036; G06T 2207/30024; G06V 10/26; G06V 10/764; G06V 10/82; G06V 10/58; G06V 2201/03
See application file for complete search history.

(56) References Cited

U.S. PATENT DOCUMENTS

| 8,280,144 B2 | 10/2012 | Subbiah et al. |
| 2012/0182541 A1* | 7/2012 | Canham ............... G01S 7/4816 356/5.01 |

(Continued)

FOREIGN PATENT DOCUMENTS

WO    2011163624 A1    12/2011

OTHER PUBLICATIONS

PCT/US2022/050867, International Search Report and Written Opinion dated Apr. 19, 2023, 11 pages.

*Primary Examiner* — Ming Y Hon
*Assistant Examiner* — Amanda H Pearson
(74) *Attorney, Agent, or Firm* — Patterson + Sheridan, LLP (57) ABSTRACT

According to certain embodiments, a system for detection of anomalous cells, comprises a hyperspectral imaging system; a memory having executable instructions stored thereon; and a processor configured to execute the executable instructions to cause the system to: receive a patient hyperspectral image comprising a pixel spectral signature for each pixel of the received patient hyperspectral image; classify the patient hyperspectral image by a machine learning model trained to classify hyperspectral images based on pixel spectral signatures; and provide an indication that the patient hyperspectral image contains an anomalous cell type, responsive to the classifying.

20 Claims, 7 Drawing Sheets

(51) Int. Cl.
*G06V 10/764* (2022.01)
*G06V 10/82* (2022.01)

(52) U.S. Cl.
CPC ............... *G06T 2207/10036* (2013.01); *G06T 2207/30024* (2013.01)

(56) References Cited

U.S. PATENT DOCUMENTS

| | | |
|---|---|---|
| 2012/0328178 A1* | 12/2012 | Remiszewski .......... G06T 11/60 382/133 |
| 2013/0089248 A1 | 4/2013 | Remiszewski et al. |
| 2019/0279362 A1* | 9/2019 | Marrero Callicó .. G06V 10/764 |
| 2020/0088579 A1 | 3/2020 | Balas |
| 2021/0148813 A1* | 5/2021 | Ingham ................ G01N 21/552 |

* cited by examiner

```
┌─────────────────────────────────────────────┐
│ RENDER, WITH THE HYPERSPECTRAL IMAGING      │
│ SYSTEM, A HYPERSPECTRAL IMAGE FOR EACH      │
│ SAMPLE OF A PLURALITY OF TISSUE SAMPLES,    │
│ COMPROMISING GENERATING SPECTRAL PROFILE    │
│ DATA FOR EACH PIXEL OF EACH HYPERSPECTRAL   │
│ IMAGE                                       │
│ 504                                         │
└─────────────────────────────────────────────┘
                      │
┌─────────────────────────────────────────────┐
│ TRAIN A MACHINE LEARNING MODEL BASED ON THE │
│ PIXEL SPECTRAL SIGNATURES TO CLASSIFY EACH  │
│ HYPERSPECTRAL IMAGE BASED ON PIXEL SPECTRAL │
│ SIGNATURES OF EACH RESPECTIVE HYPERSPECTRAL │
│ IMAGE                                       │
│ 508                                         │
└─────────────────────────────────────────────┘
                      │
┌─────────────────────────────────────────────┐
│ RECEIVE A PATIENT HYPERSPECTRAL IMAGE       │
│ 512                                         │
└─────────────────────────────────────────────┘
                      │
┌─────────────────────────────────────────────┐
│ CLASSIFY THE PATIENT HYPERSPECTRAL IMAGE    │
│ BY THE TRAINED MACHINE LEARNING MODEL       │
│ 516                                         │
└─────────────────────────────────────────────┘
                      │
┌─────────────────────────────────────────────┐
│ PROVIDE AN INDICATION THAT THE PATIENT      │
│ HYPERSPECTRAL IMAGE CONTAINS ONE AN         │
│ ANOMALOUS CELL TYPE, RESPONSIVE TO THE      │
│ CLASSIFYING                                 │
│ 520                                         │
└─────────────────────────────────────────────┘
```

FIG. 5

FIG. 6

ARTIFICIAL INTELLIGENCE-BASED HYPERSPECTRALLY RESOLVED DETECTION OF ANOMALOUS CELLS

CROSS-REFERENCE TO RELATED APPLICATIONS

This application claims priority to and benefit of U.S. Provisional Patent Application Ser. No. 63/282,803, entitled "AI Enabled Hyperspectrally Resolved Detection of Anomalous Cells," filed Nov. 24, 2021, and assigned to the assignee hereof, the contents of which are incorporated by reference in its entirety.

BACKGROUND

Field

Embodiments of the present disclosure generally relate to anomalous cell detection in a tissue sample using image spectral data, and more particularly to detecting anomalous cells using a machine learning model trained with image spectral data to classify cell types.

Description of the Related Art

For detection of cancer and other anomalous cell types, a tissue sample is typically stained with a hematoxylin and eosin (H&E) dye and imaged with a white light via an imaging microscope. A pathologist then visually analyzes the tissue sample images and makes decisions about the presence and progression of anomalous cells.

However, for some anomalous cell types, such as early stage cancer cells, conventional dyes may not provide sufficient contrast with surrounding normal cells and stoma such that a pathologist can confidently determine the presence, or absence of, of an anomalous cell type. As a result, these early stage cancers may be overlooked by the pathologist, resulting in a loss of early stage treatment options in affected patients.

Therefore, there is a need for techniques that overcome human visual limitations for the inspection of tissue samples and thus accurately detect anomalous cells in tissue samples.

SUMMARY

According to certain embodiments, a system for detection of anomalous cells, comprises a hyperspectral imaging system; a memory having executable instructions stored thereon; and a processor configured to execute the executable instructions to cause the system to: receive a patient hyperspectral image comprising a pixel spectral signature for each pixel of the received patient hyperspectral image; classify the patient hyperspectral image by a machine learning model trained to classify hyperspectral images based on pixel spectral signatures; and provide an indication that the patient hyperspectral image contains an anomalous cell type, responsive to the classifying.

Further embodiments disclose a processor-implemented method, comprising: receiving a patient hyperspectral image comprising a pixel spectral signature for each pixel of the received patient hyperspectral image; classifying the patient hyperspectral image by a machine learning model trained to classify hyperspectral images based on pixel spectral signatures; and providing an indication that the patient hyperspectral image contains an anomalous cell type, responsive to the classifying.

Further embodiments disclose a processor-implemented method, comprising: rendering, via a hyperspectral imaging system, a hyperspectral image for each sample of a plurality of tissue samples, comprising a pixel spectral signature for each pixel of each hyperspectral image; assigning a classification to the pixel spectral signature for each pixel of each hyperspectral image; and training a machine learning model based on the pixel spectral signatures to classify each hyperspectral image based on pixel spectral signatures of each respective hyperspectral image.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Conventionally, to detect anomalous cells such as cancerous cells in a tissue sample, tissue samples are stained with an H&E, and other kinds of dye (e.g., Ki67, HER2, ER, PR, and so on), and placed on a microscope slide to form a static sample. These static samples are scanned in-plane under a microscope with visual white light to generate a number of images that are subsequently reviewed by a pathologist, who makes objective and subjective decisions as to the presence, or lack of presence, of anomalous cell types.

However, H&E dyes may vary from source to source, guidelines in the application of H&E dyes and scanning protocols vary from lab to lab, and the ability for H&E dyes to differentiate between different cell membrane types at visual optical light wavelengths can be poor where the difference between normal and potentially anomalous cell types (between normal cell types and early stage cancer) is visually small or indistinguishable to the human eye. As a result, visual inspection by a pathologist may overlook differences between normal cells and some cancerous cells, such as early stage cancer cells.

To overcome these and other shortcomings in conventional approaches, according to systems and methods disclosed herein, a dyed tissue sample is imaged using a hyperspectral camera, using light in visual spectrum and in non-visible spectra, such as the near-infrared (NIR) spectrum, far infrared spectrum, and other non-visible spectra. For each pixel of each image, a spectral signature of imaged cells is generated and stored, in effect creating a three dimensional hyperspectral cube for each image. In this three-dimensional hyperspectral cube, two dimensions may correspond to the height and width of the image, and the third dimension may correspond to spectral data (e.g., a spectral signature) associated with the imaged cells.

While different cell membranes may be difficult to visually differentiate when imaged with visual white light, cell membranes generally become distinguishable when viewed under visual to near infrared (VIS-NIR) light. Further, different types of cells may have different spectral signatures. According to certain embodiments, the spectral signature of each pixel is used to artificially assign a color to each pixel of a visual image so that a human viewer may visually see the difference between portions of the image having pixels of different spectral signatures (corresponding to cell membranes, normal cells, and potentially anomalous cells). The human viewer may then label each region of the image to show where normal cells are shown and where anomalous cells are shown. According to certain embodiments, normal cells may include healthy cells of various types and stroma, whereas anomalous cells may be cancerous or pre-cancerous cell types.

Once images are labeled based on the cell type indicated by the spectral signatures of pixels making up the various portions of each image, the labeled images are used to train a machine learning model such as a convolutional neural network (CNN). In some embodiments, the machine learning model may be an unsupervised machine learning model, such as a clustering model, trained to classify and label image portions based on spectral signature data associated with different portions of an image. The trained CNN is then used to identify anomalous cells in future images, including patient hyperspectral images, from patient tissue samples, based on pixel spectral signatures making up each image.

By training a machine learning model to recognize spectral signature data and classify imaged cells, more accurate analysis of tissue samples may be achieved. In addition, human subjectivity can be removed from the analysis process, producing better patient outcomes.

Example System

Figure 1:
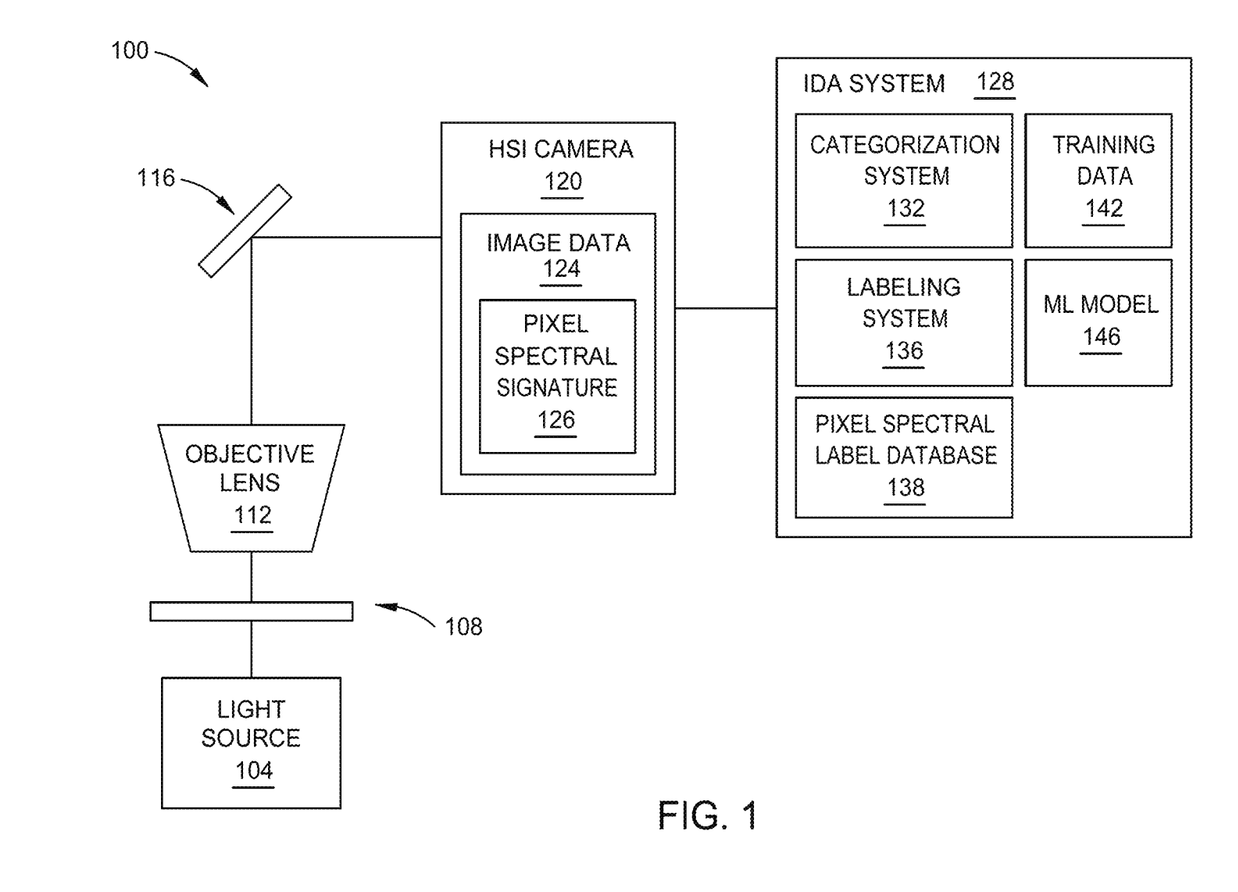
FIG. 1 depicts an example system for anomalous cell detection, according to certain embodiments.

FIG. 1 depicts an example system 100 for anomalous cell detection, according to certain embodiments. System 100 includes a light source 104 that according to certain embodiments is a broadband white light source that emits light wavelengths in the visual through short wave infrared ranges, such as 400-2500 nm, and in some embodiments in the visual through near infrared range, such as 400-1700 nm.

Light source 104 is positioned to couple light emitted from the light source 104 through a sample 108. Sample 108 may be prepared by any method, or combination of methods, enabling analysis of the sample 108 using the system 100. According to certain embodiments, sample 108 is a tissue sample that has been treated with one or more dyes that enable differentiation between different cell types, or cell membranes of different cell types, such as H&E dyes or other dyes suitable for staining a sample and allowing for differentiation between different cell types or membranes of different cell types. In some embodiments, however, sample 108 need not be prepared using a dye, as use of spectral signature data of a sample imaged by system 100 is sufficient to differentiate between different cell types of some samples.

System 100 further includes an objective lens 112 that is capable of capturing light traveling through sample 108 in multiple wavelength bands. According to certain embodiments, objective lens 112 is an objective lens, capable of receiving more than 50 wavelengths of light, and in some embodiments up to 299 or more different wavelengths of light. According to certain embodiments, objective lens 112 is a broadband objective lens for applications in which a broad range of wavelengths may be needed, and in other embodiments, objective lens 112 is a narrowband objective lens for applications requiring a narrower range of wavelengths. Light provided by the light source 104 passes through the sample 108, with objective lens 112 receiving visual light in the red-green-blue (RGB) wavelengths, and light being in at least one wavelength band outside of the RGB bands. More commonly, in addition to RGB bands, objective lens 112 may receive many bands of light from across the wavelength range of the light source 104.

Light received by the objective lens 112 is coupled to a mirror 116 that couples the received light to a hyperspectral imaging (HSI) camera 120 of a hyperspectral imaging system. According to certain embodiments, mirror 116 is a reflective mirror found in microscopes and similar scanning systems. In other embodiments, mirror 116 may be a dichroic mirror to selectively couple one or more desired light bands, a prism, a grating, or other optical element that can couple received light to one or more downstream systems for image generation, analysis, and review. Although mirror 116 is shown to couple received light to downstream systems, it is understood that in some embodiments light received from the objective lens 112 may be provided directly to downstream systems.

Figure 3A:
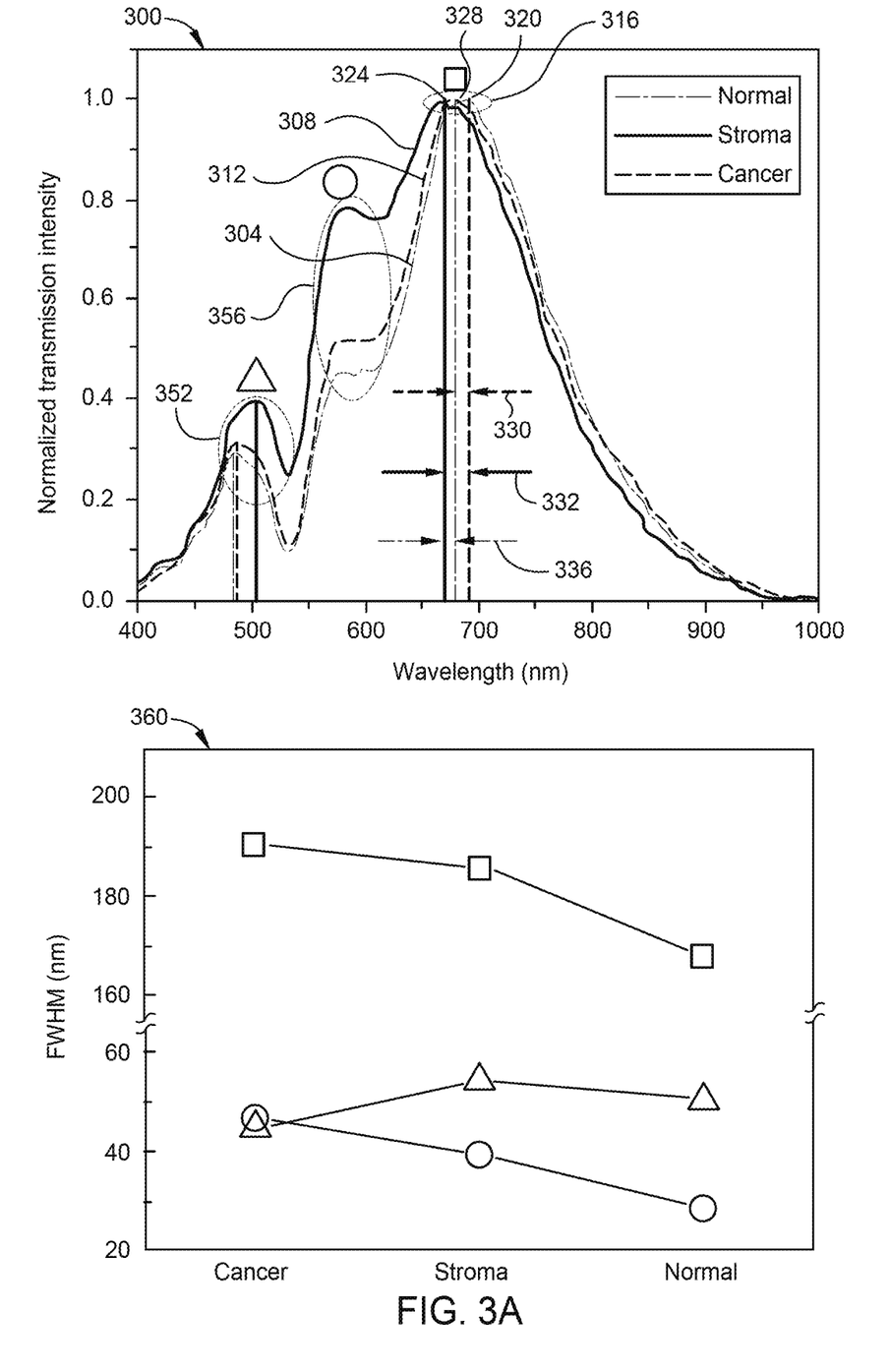
FIGS. 3A and 3B depict spectral signature data, according to certain embodiments.

Light received by the objective lens 112 is coupled to HSI camera 120, in some embodiments via one or more optical elements such as mirror 116. The received light is detected by HSI camera 120 and converted to hyperspectral image data, such as image data 124. For each pixel of image data 124, in addition to RGB data being stored, pixel spectral signature 126 data is stored that includes intensity data for multiple (e.g., up to 299, and in certain embodiments more) wavelength bands of light. FIG. 3A depicts spectral signature data, according to certain embodiments. Spectral signature data 300 depicts three different spectral signatures, for three different cell types. Normal spectral signature 304 depicts a pixel spectral signature 126 for a normal cell, stroma spectral signature 308 depicts a pixel spectral signature 126 for a stroma cell, and anomalous spectral signature 312 depicts a pixel spectral signature 126 for an anomalous cell such as a cancerous cell. Although a hyperspectral camera is disclosed above, according to some embodiments a multispectral camera may be employed, where a more limited number of wavelength bands are to be analyzed. According to certain embodiments where a more limited number of spectral bands is analyzed, a multispectral camera may be used.

Figure 4:
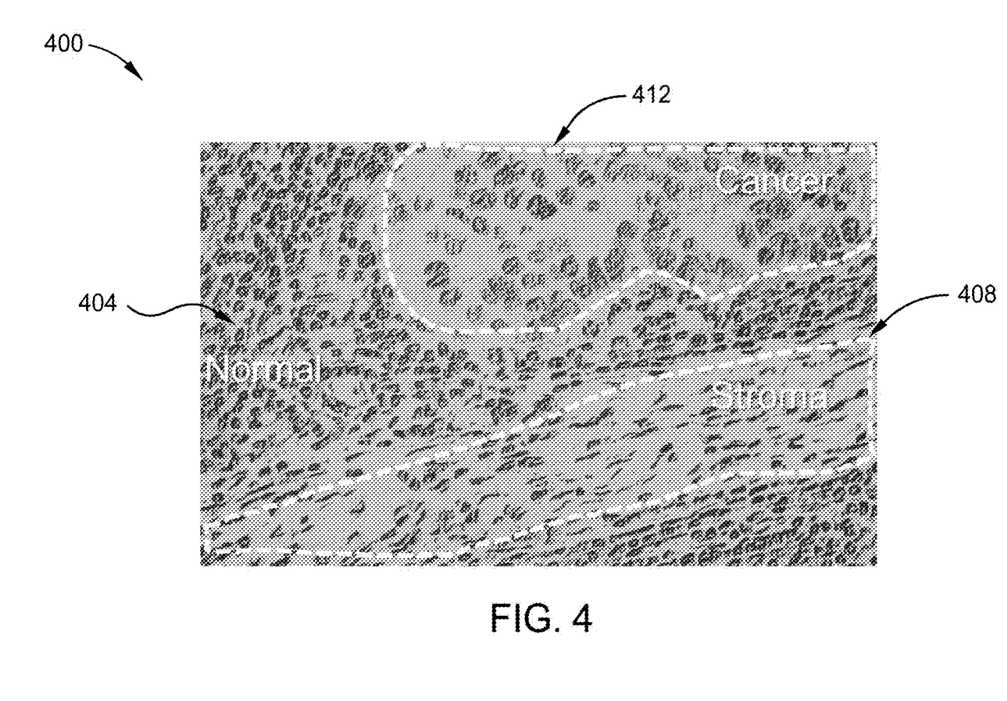
FIG. 4 depicts an example gray-scale image of an image provided with visual color based on pixel spectral signature data, according to certain embodiments.

According to certain embodiments, different RGB values may be arbitrarily assigned to each pixel, based on the spectral signature of each respective pixel. According to certain embodiments where a human viewer may view the image, RGB values may be chosen to contrast cell types having different spectral signatures to the human viewer. This additional visual color assignment can be helpful to human analysis of a given image. FIG. 4 depicts an example gray-scale image 400 of an image provided with visual color based on pixel spectral signature 126 data, according to certain embodiments. The demarcated portions of gray-scale image 400 denote areas having normal cells 404, stroma cells 408, and anomalous cells 412 such as cancerous cells. Although gray-scale image 400 is shown in gray scale, in some embodiments different colors are assigned to the portions indicated as being of different cell types based on pixel spectral signatures, for ease of detection and viewing.

System 100 of FIG. 1 includes an image data analysis (IDA) system 128, for processing of image data 124 received from the HSI camera 120. IDA system 128 includes a categorization system 132 for categorizing portions of the image data 124 as at least one of normal and anomalous. According to certain embodiments, a person may look at human-readable views of image data 124, such as gray-scale image 400 with colors assigned based on pixel spectral signatures 126, to categorize each differently colored portion as one of normal (e.g., healthy cells and stroma) or anomalous (e.g., cancerous cells, diseased cells, infected cells, or cells that are otherwise not healthy). In some embodiments, the categorization system may automatically assign a category to a pixel based on the pixel spectral signature 126 data that may be a color or a data indicator of the categorized cell type that includes the pixel spectral signature 126.

Figure 3B:
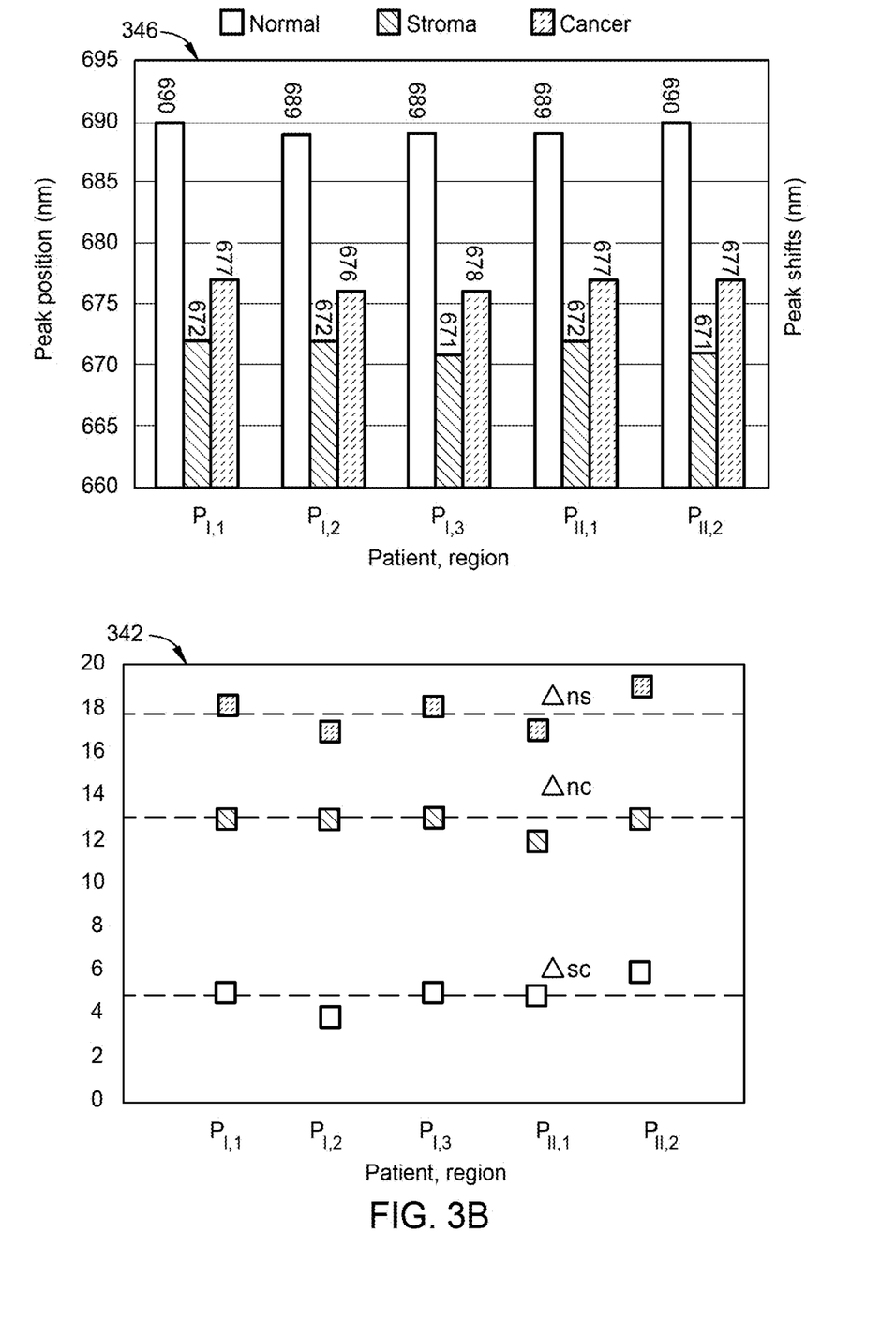

As part of categorization, whether by assigning arbitrary human viewable colors to pixel regions having spectral signatures indicating normal vs anomalous cell types, or assigning labels indicating cell types, spectral data is used in the determination of cell type. In some embodiments, the primary spectral peak data 316 of FIG. 3A may be used, indicating an intensity and wavelength at which a cell type (e.g., normal, stroma, anomalous) exhibits peak intensity at a given wavelength. Primary peak data 316 can be seen to have different intensity and wavelength values for a normal primary peak 320 for normal cells, a stroma primary peak 324 for stroma cells, and an anomalous primary peak 328 for anomalous cells. Once the normal primary peak 320 is identified, in some embodiments a difference between wavelength components of a normal primary peak 320, such as a delta normal-anomalous 330 (e.g., cancerous) (Δnc), a delta normal-stroma 332 (Δns), and a delta stroma-anomalous 336 (Δsc), and plotted separately as shown at plot 342 illustrated in FIG. 3B, to indicate differences between spectral signatures of different cell types. As can be seen in plot 342, there is consistency between the deltas of the spectral signature data of different cell types of different patient samples. Moreover, as can be seen at graph 346 illustrated in FIG. 3B, primary peak data 316 for different cell types is relatively consistent across patient samples.

In some embodiments, pixel spectral signatures may, in addition to being differentiated by primary peak data 316, be differentiated by secondary peak data 352, and tertiary peak data 356. Depending on the nature of a given pixel spectral signature, additional, or fewer, peaks may be used in the analysis described herein.

In addition to peak-based data, spectral signature full width half maximum (FWHM) data may be used in differentiating between the spectral signatures of different pixels. FWHM, according to certain embodiments, is the width of the spectral signature at half of its maximum peak value. A comparison of FWHM values at primary peak data 316, secondary peak data 352, and tertiary peak data 356 may be seen at plot 360 illustrated in FIG. 3A. As would be appreciated by one of skill in the art, FWHM data may be used for the ML algorithm, in addition to peak data to categorize different pixel spectral signatures.

Once portions of image data 124 are categorized based on pixel spectral signatures 126 (e.g., primary, secondary, tertiary peak data, FWHM data), each spectral signature, and corresponding image data 124 portion, is labeled with a cell type indicated by the pixel spectral signature with a labeling system 136. The labels are added to the image data 124, and are chosen by a person based on research into the spectral signatures at issue, and/or may be retrieved from a pixel spectral label database 138 (e.g., based on associations between pixel spectral signatures 126 and a priori defined labels to be assigned to different portions of image data 124).

Once image data 124 has been categorized and labeled, the categorized and labeled image data is provided as training data 142 to train a machine learning (ML) model 146. The trained ML model will be used to classify test images received by the system 100 as having, or not having, anomalous cells. The trained model's filters learn to extract peaks from image data as a feature map to get an optimal classification performance. According to certain embodiments, ML model 146 may include one or more of a random forest walk, a support vector machine, a decision tree, a convolutional neural network, or other ML model capable of classifying images, or portions of images, based on being trained by the training data 142. These ML models may, for example, be models capable of segmenting an image into a plurality of categories according to a categorization assigned to different types of cells in an image (e.g., normal cells, abnormal (cancerous, pre-cancerous, etc.) cells, stroma cells, etc.). In segmenting an image into a plurality of categories, these ML models can generate a segmentation map dividing the image into a plurality of segments. Each segment of the plurality of segments may be associated with one of a plurality of categories with which the ML model was trained. Thus, the segmentation map can identify segments of an image as segments depicting normal cells, segments depicting abnormal cells, stroma cells, and other types of cells that may be identified through the ML model 146.

Although IDA system 128 is depicted with the categorization system 132, the labeling system 136, training data 142, and ML model 146, according to certain embodiments, one or more of these may be physically located remotely from system 100 and accessed via a network.

Example Process

Figure 2:
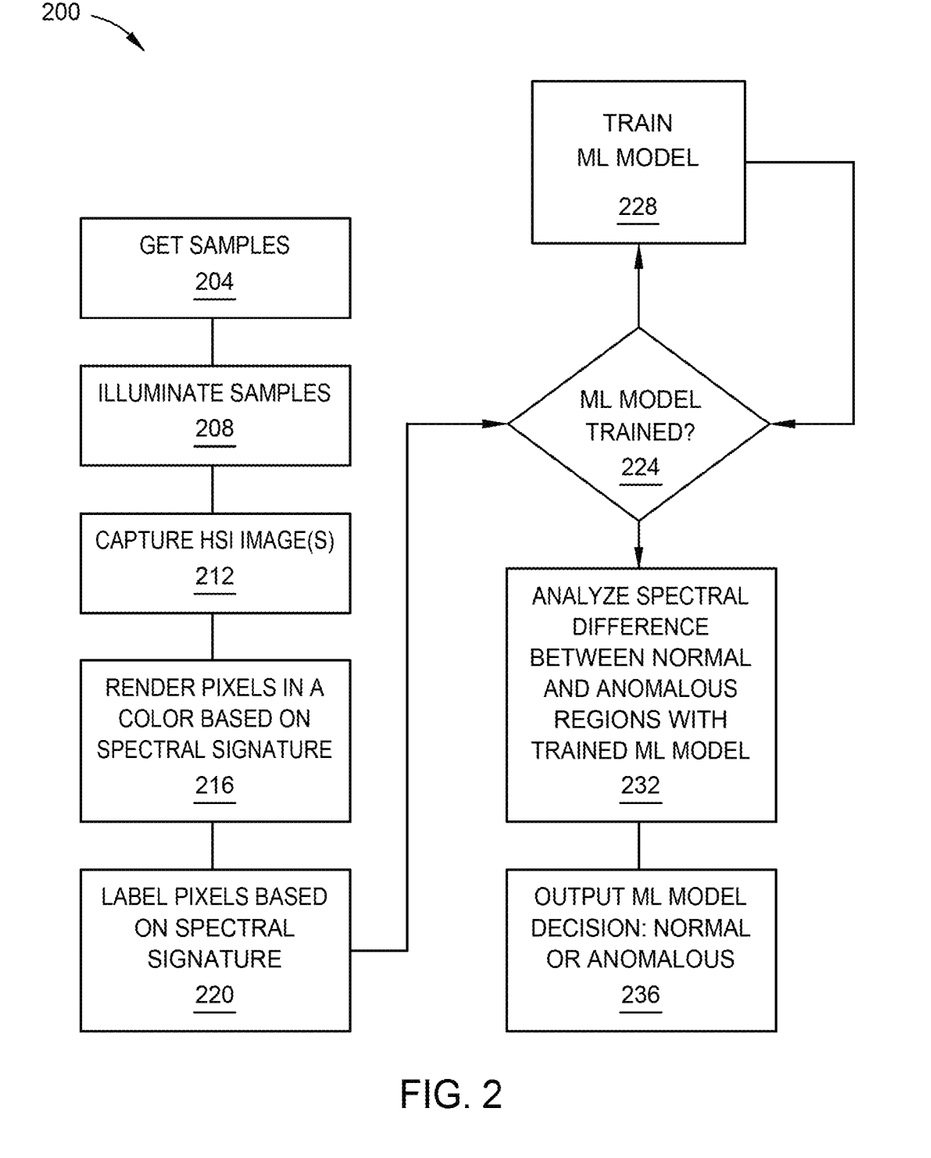
FIG. 2 depicts an example process for anomalous cell detection, according to certain embodiments.

FIG. 2 depicts an example process 200 for anomalous cell detection, according to certain embodiments. At block 204, one or more samples 108 are obtained for analysis. The samples are be prepared for imaging with a microscope or other scanning system. At block 208, the sample 108 is illuminated with light source 104. As discussed, light source 104 can illuminate the sample 108 using hyperspectral light, such as light in visual to infrared bands, and in some embodiments visual to near infrared bands. In some embodiments, other wavelengths of light may be provided, such as ultraviolet, x-rays, and radar through AM wavelengths.

At block 212, HSI camera 120 captures image data 124, including spectral data for each pixel of the captured images. At block 216, categorization system 132 renders pixels in a color based on the spectral signature of individual pixels, so that portions of the image data may be categorized by a human viewer or automated system, such as a machine learning model capable of differentiating portions of the image based on color and/or spectral signature.

At block 220, pixels of image data 124 are labeled based on the categorization. According to certain embodiments, pixels may be labeled as indicating a normal cell or stroma, or an anomalous cell such as a cancerous, infected, or otherwise unhealthy cell. In some embodiments, an 'anomalous' cell may be one that is different from a 'normal cell'; in this context the anomalous cell is a type of cell of interest, that may be present among a large number of normal cells. Although disclosed embodiments contemplate using a trained ML model to differentiate between anomalous and normal cells, embodiments may be similarly used to identify a cell of a particular type in a population of cells, without regard to any cell being 'anomalous', 'normal', or of some other status.

At block 224, the IDA system 128 determines if a trained version of a ML model 146 is available. If a trained version of a ML model 146 is not available, the process proceeds to block 228 where ML model 146 is trained with categorized and labeled data. Otherwise, the process proceeds to block 232.

At block 232, differences in spectral data between normal and anomalous regions are analyzed with the trained machine learning model 146, providing an output at block 236 to a user device indicating the presence of anomalous and or normal cell types. In some embodiments, where a trained ML model is available, the output provided at block 236 and user feedback regarding the output provided at block 236 may be added to a training data 142 for use in re-training the ML model. For example, when a user indicates that the output provided at block 236 is incorrect (e.g., that cells assigned one classification should, in fact, be assigned a different classification), the corrected output may be saved for subsequent use in re-training the ML model to improve the accuracy of subsequent classifications generated by the ML model.

Example Method

Figure 5:
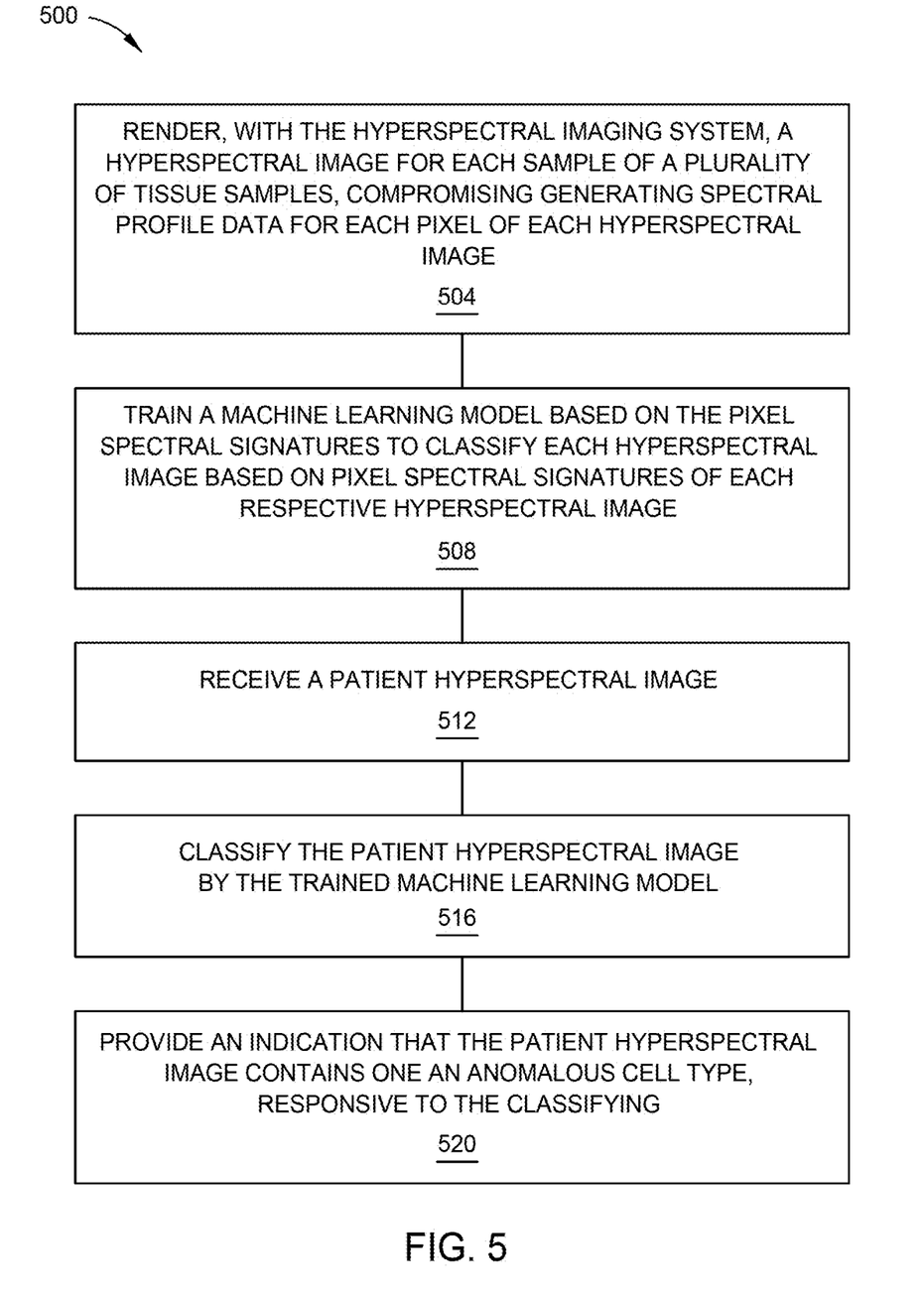
FIG. 5 depicts an example method for anomalous cell detection, according to certain embodiments.

FIG. 5 depicts an example method 500 for anomalous cell detection, according to certain embodiments. At block 504, system 100 renders, with the hyperspectral imaging system, such as HSI camera 120, a hyperspectral image that includes image data 124 for each sample of a plurality of tissue samples, comprising pixel spectral signature 126 for each pixel of each hyperspectral image.

At block 508, the IDA system 128 trains the machine learning model 146 based on the pixel spectral signatures to classify each hyperspectral image based on pixel spectral signatures of each respective hyperspectral image. According to certain embodiments, the machine learning model is an unsupervised machine learning model, and in some embodiments is a convolutional neural network.

At block 512, a patient hyperspectral image is received by the IDA system 128, and at block 516, the trained ML model 146 classifies the patient hyperspectral image. At block 520, the IDA system 128 provides an indication that the patient hyperspectral image contains an anomalous cell type, responsive to the classifying.

Example Processing System

Figure 6:
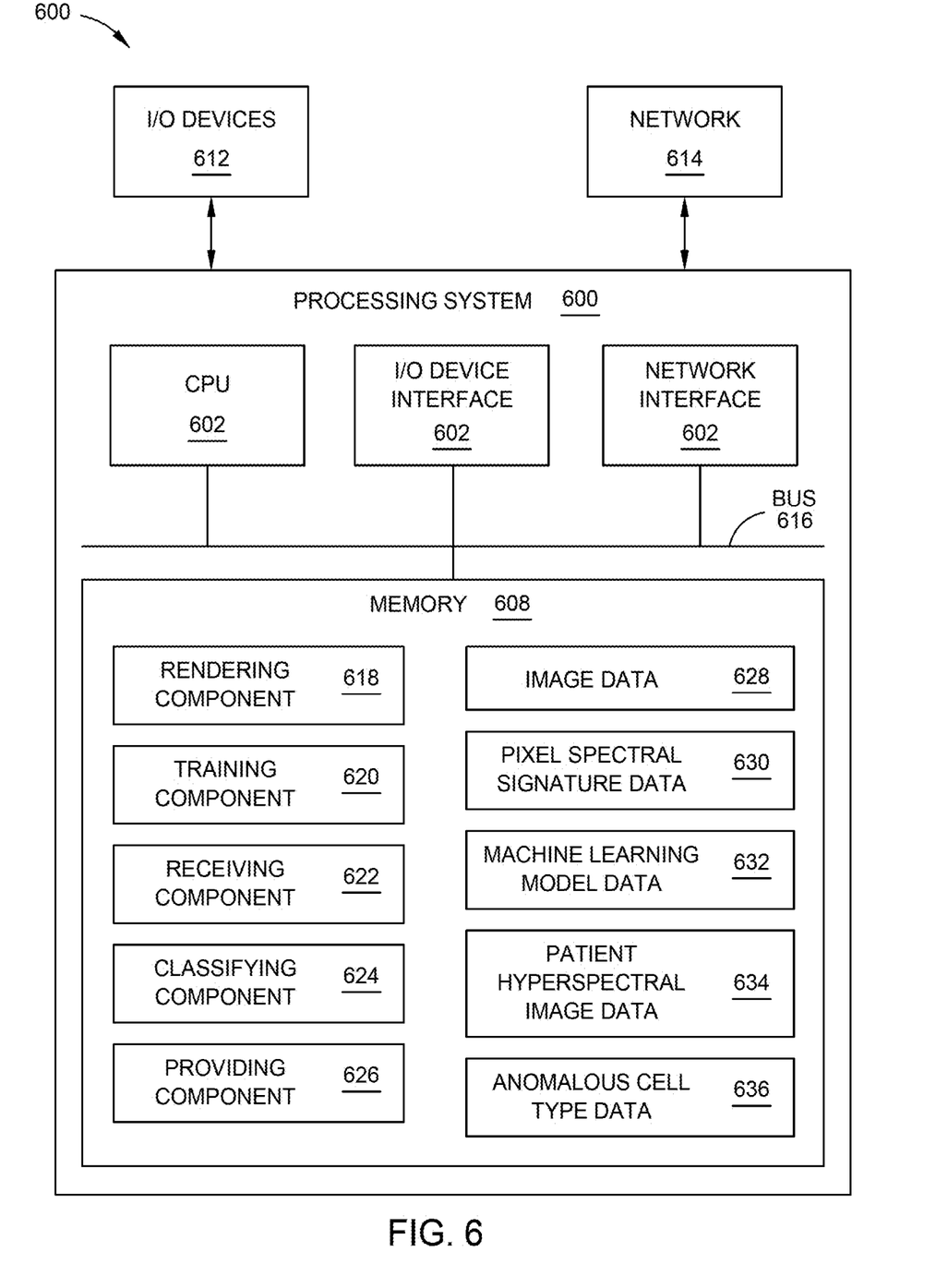
FIG. 6 depicts an example processing system 600, according to certain embodiments.

FIG. 6 depicts an example processing system 600, according to certain embodiments that may perform methods described herein, such as the method for detecting anomalous cells described with respect to FIGS. 4 and 5.

Processing system 600 includes a central processing unit (CPU) 602 connected to a data bus 616. CPU 602 is configured to process computer-executable instructions, e.g., stored in memory 608, and to cause the server 600 to perform methods described herein, for example, with respect to FIGS. 2 and 5. CPU 602 is included to be representative of a single CPU, multiple CPUs, a single CPU having multiple processing cores, and other forms of processing architecture capable of executing computer-executable instructions. Memory 608 is included to be representative of one or more memory devices such as volatile memories, that may be a RAM, cache, or other short-term memory that may be implemented in hardware or emulated in software, one or more non-volatile memories such as a hard drive, solid state drive, or other long term memory that may be implemented in hardware or emulated in software, or a combination of volatile and non-volatile memories. Moreover, one or more memory devices that makeup memory 608 may be located remotely from processing system 600 and accessed via a network.

Processing system 600 further includes input/output (I/O) device(s) 612 and interfaces 604, which allows processing system 600 to interface with input/output devices 612, such as, for example, keyboards, displays, mouse devices, pen input, and other devices that allow for interaction with processing system 600. Note that processing system 600 may connect with external I/O devices through physical and wireless connections (e.g., an external display device).

Processing system 600 further includes a network interface 606, which provides processing system 600 with access to external network 614 and thereby external computing devices.

Processing system 600 further includes memory 608, which in this example includes a rendering component 618, a training component 620, a receiving component 622, a classifying component 624, and a providing component 626 for performing operations described in FIGS. 4 and 5. Memory 608 further includes in this example image data 628, pixel spectral signature data 630, machine learning model data 632, patient hyperspectral image data 634, and anomalous cell type data 634, that may be used in performing operations described in FIGS. 4 and 5.

Note that while shown as a single memory 608 in FIG. 6 for simplicity, the various aspects stored in memory 608 may be stored in different physical memories, including memories remote from processing system 600, but all accessible by CPU 602 via internal data connections such as bus 616.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While the foregoing is directed to embodiments of the present disclosure, other and further embodiments of the disclosure may be devised without departing from the basic scope thereof, and the scope thereof is determined by the claims that follow.

What is claimed is:

1. A system for detection of anomalous cells, comprising:
    a hyperspectral imaging system;
    memory having executable instructions stored thereon; and
    a processor configured to execute the executable instructions to cause the system to:
        receive a patient hyperspectral image comprising a respective pixel spectral signature for each pixel of the received patient hyperspectral image;
        classify the patient hyperspectral image by a machine learning model trained to classify hyperspectral images based on pixel spectral signatures, wherein the patient hyperspectral image is classified by:
            identifying a normal primary peak wavelength, a stroma primary peak wavelength, and an anomalous primary peak wavelength of the respective pixel spectral signatures of the patient hyperspectral image; and
            determining a cell type within the patient hyperspectral image based on at least one of:
                a difference between the normal primary peak wavelength and the anomalous primary peak wavelength;
                a difference between the normal primary peak wavelength and the stroma primary peak wavelength; or
                a difference between the stroma primary peak wavelength and the anomalous primary peak wavelength; and
        provide an indication that the patient hyperspectral image contains an anomalous cell type, responsive to the classifying.

2. The system of claim 1, wherein in order to classify the patient hyperspectral image, the processor is configured to cause the system to segment the patient hyperspectral image into first portions of the patient hyperspectral image associated with normal cells and second portions of the patient hyperspectral image associated with abnormal cells.

3. The system of claim 2, wherein the processor is further configured to cause the system to apply a first color to the first portions of the patient hyperspectral image and a second color to the second portions of the patient hyperspectral image.

4. The system of claim 2, wherein the processor is further configured to:
    receive feedback correcting a classification assigned to at least one of the first portions of the patient hyperspectral image or the second portions of the patient hyperspectral image;
    augment a training data set to include the patient hyperspectral image and the correction to the classification assigned to the at least one of the first portions of the patient hyperspectral image or the second portions of the patient hyperspectral image; and
    retrain the machine learning model based on the augmented training data set.

5. The system of claim 1, wherein the hyperspectral imaging system comprises a hyperspectral light source illuminating a patient sample and an imaging device configured to capture data in visible spectrum and non-visible spectrum.

6. The system of claim 1, wherein the patient hyperspectral image comprises a three-dimensional image having spatial data on a width dimension and a height dimension and spectral data on a third dimension.

7. The system of claim 1, wherein the respective pixel spectral signatures are calculated based at least on secondary peak spectral data.

8. A processor-implemented method, comprising:
    receiving a patient hyperspectral image comprising a respective pixel spectral signature for each pixel of the received patient hyperspectral image;
    classifying the patient hyperspectral image by a machine learning model trained to classify hyperspectral images based on pixel spectral signatures, wherein the patient hyperspectral image is classified by:
- identifying a normal primary peak wavelength, a stroma primary peak wavelength, and an anomalous primary peak wavelength of the respective pixel spectral signatures of the patient hyperspectral image; and
- determining a cell type within the patient hyperspectral image based on at least one of:
  - a difference between the normal primary peak wavelength and the anomalous primary peak wavelength;
  - a difference between the normal primary peak wavelength and the stroma primary peak wavelength; or
  - a difference between the stroma primary peak wavelength and the anomalous primary peak wavelength; and
- providing an indication that the patient hyperspectral image contains an anomalous cell type, responsive to the classifying.

9. The method of claim 8, wherein classifying the patient hyperspectral image comprises segmenting the patient hyperspectral image into first portions of the patient hyperspectral image associated with normal cells and second portions of the patient hyperspectral image associated with abnormal cells.

10. The method of claim 9, further comprising applying a first color to the first portions of the patient hyperspectral image and a second color to the second portions of the patient hyperspectral image.

11. The method of claim 9, further comprising:
- receiving feedback correcting a classification assigned to at least one of the first portions of the patient hyperspectral image or the second portions of the patient hyperspectral image;
- augmenting a training data set to include the patient hyperspectral image and the correction to the classification assigned to the at least one of the first portions of the patient hyperspectral image or the second portions of the patient hyperspectral image; and
- retraining the machine learning model based on the augmented training data set.

12. The method of claim 8, wherein the patient hyperspectral image is received from a hyperspectral imaging system comprises a hyperspectral light source illuminating a patient sample and an imaging device configured to capture data in visible spectrum and non-visible spectrum.

13. The method of claim 8, wherein the patient hyperspectral image comprises a three-dimensional image having spatial data on a width dimension and a height dimension and spectral data on a third dimension.

14. The method of claim 9, wherein the respective pixel spectral signatures are calculated based at least on secondary peak spectral data.

15. A processor-implemented method, comprising:
- rendering, via a hyperspectral imaging system, a patient hyperspectral image for each sample of a plurality of tissue samples, comprising a respective pixel spectral signature for each pixel of each patient hyperspectral image;
- assigning a classification to the respective pixel spectral signature for each pixel of each patient hyperspectral image, wherein the respective pixel spectral signature for each pixel of each patient hyperspectral image is assigned a classification by:
  - identifying a normal primary peak wavelength, a stroma primary peak wavelength, and an anomalous primary peak wavelength of the respective pixel spectral signatures of the patient hyperspectral image; and
  - determining a cell type within the patient hyperspectral image based on a peak delta, the peak delta being substantially consistent across multiple patient hyperspectral images, the peak delta being at least one of:
    - a difference between the normal primary peak wavelength and the anomalous primary peak wavelength;
    - a difference between the normal primary peak wavelength and the stroma primary peak wavelength; or
    - a difference between the stroma primary peak wavelength and the anomalous primary peak wavelength; and
- training a machine learning model based on the respective pixel spectral signatures to classify each patient hyperspectral image based on the pixel spectral signatures of each respective patient hyperspectral image.

16. The method of claim 15, wherein training the machine learning model comprises training the machine learning model based on an intensity peak position in wavelengths of a pixel spectral profile data.

17. The method of claim 15, wherein the machine learning model comprises an unsupervised machine learning model.

18. The method of claim 17, wherein the unsupervised machine learning model comprises a convolutional neural network.

19. The system of claim 1, wherein the patient hyperspectral image is based on a peak delta, wherein the peak delta is substantially consistent across multiple patient hyperspectral images.

20. The method of claim 8, wherein the patient hyperspectral image is based on a peak delta, wherein the peak delta is substantially consistent across multiple patient hyperspectral images.

* * * * *